United States Patent
Nadeau et al.

(10) Patent No.: US 8,254,271 B1
(45) Date of Patent: Aug. 28, 2012

(54) POINT-TO-MULTIPOINT CONNECTIVITY VERIFICATION

(75) Inventors: Thomas D. Nadeau, Hampton, NH (US); George Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 11/762,218

(22) Filed: Jun. 13, 2007

Related U.S. Application Data

(60) Provisional application No. 60/814,299, filed on Jun. 16, 2006.

(51) Int. Cl.
*H04L 12/26* (2006.01)
*G01R 31/08* (2006.01)

(52) U.S. Cl. ..................................................... 370/241.1

(58) Field of Classification Search ............... 370/241.1, 370/236.2, 408
See application file for complete search history.

(56) References Cited

U.S. PATENT DOCUMENTS

| | | | | |
|---|---|---|---|---|
| 6,600,581 | B1 * | 7/2003 | Fatehi et al. ...................... | 398/9 |
| 7,359,328 | B1 * | 4/2008 | Allan ......................... | 370/236.2 |
| 7,519,712 | B2 * | 4/2009 | Ito ................................. | 709/227 |
| 2003/0191831 | A1 * | 10/2003 | Hu et al. ....................... | 709/223 |
| 2004/0028078 | A1 * | 2/2004 | Beckmann et al. ........... | 370/469 |
| 2005/0022189 | A1 * | 1/2005 | Proulx et al. .................. | 718/100 |
| 2005/0287982 | A1 * | 12/2005 | Brewer et al. ................. | 455/405 |
| 2006/0203717 | A1 * | 9/2006 | Puppa et al. ................... | 370/216 |
| 2006/0209825 | A1 * | 9/2006 | Carroll et al. ................. | 370/390 |
| 2007/0076720 | A1 * | 4/2007 | Wu ................................ | 370/392 |

OTHER PUBLICATIONS

D. Katz, et al., BFD for Multipoint Networks, draft-katz-ward-bfd-multipoint-00.txt, Jan. 2007, pp. 1-29.
G. Swallow, et al., Connectivity Verification for Multicast Label Switched Paths, draft-swallow-mpls-mcast-cv-00.txt, Oct. 2006, pp. 1-5.
R. Aggarwal, et al., BFD for MPLS LSPs, draft-ietf-bfd-mpls-03.txt, Jun. 2006, pp. 1-16.
S. Yasukawa, et al., Detecting Data Plane Failures in Point-to-Multipoint Multiprotocol Label Switching (MPLS)—Extensions to LSP Ping, draft-ietf-mpls-p2mp-lsp-ping-02.txt, Sep. 2006, pp. 1-26.
K. Kompella, et al., Detecting Multi-Protocol Label Switched (MPLS) Data Plane Failures, Request for Comments 4379, Feb. 2006, pp. 1-50.

* cited by examiner

*Primary Examiner* — Dang Ton
*Assistant Examiner* — Kevin Lee
(74) *Attorney, Agent, or Firm* — Brinks Hofer Gilson & Lione

(57) ABSTRACT

Improved connectivity verification is disclosed. A root in a point-to-multipoint network can establish parameters for a connectivity-verification session with each endpoint in the network. The root then sends verification-request messages to each endpoint in accordance with the parameters. Each endpoint signals an alarm (e.g., sends a reply to the root) if the verification-request messages are not received at the endpoint in accordance with the established parameters. In this manner, endpoints send verification-reply messages to the root much less frequently, greatly reducing the congestion at the root and greatly reducing the chance that the root gets congested or even overwhelmed when the network includes large numbers of endpoints.

29 Claims, 7 Drawing Sheets

310
ESTABLISH PARAMETERS FOR A CONNECTIVITY-VERIFICATION SESSION BETWEEN A FIRST NODE AND A SECOND NODE IN A NETWORK, THE PARAMETERS INCLUDING AN INDICATION OF AT LEAST ONE ACTION FOR THE SECOND NODE TO PERFORM IF THE SECOND NODE DOES NOT RECEIVE VERIFICATION-REQUEST MESSAGES IN ACCORDANCE WITH THE PARAMETERS DURING THE CONNECTIVITY-VERIFICATION SESSION

320
SEND VERIFICATION-REQUEST MESSAGES FROM THE FIRST NODE TO THE SECOND NODE IN ACCORDANCE WITH THE ESTABLISHED PARAMETERS DURING THE CONNECTIVITY-VERIFICATION SESSION

410
FOR EACH ENDPOINT IN A POINT-TO-MULTIPOINT NETWORK INCLUDING A ROOT AND A PLURALITY OF ENDPOINTS, ESTABLISH PARAMETERS FOR A CONNECTIVITY-VERIFICATION SESSION BETWEEN THE ROOT AND THE ENDPOINT, THE PARAMETERS INCLUDING AN INDICATION OF AT LEAST ONE ACTION FOR THE ENDPOINT TO PERFORM IF THE ENDPOINT DOES NOT RECEIVE VERIFICATION-REQUEST MESSAGES IN ACCORDANCE WITH THE PARAMETERS DURING THE CONNECTIVITY-VERIFICATION SESSION

420
FOR EACH ENDPOINT IN THE POINT-TO-MULTIPOINT NETWORK, SEND VERIFICATION-REQUEST MESSAGES FROM THE ROOT TO THE ENDPOINT IN ACCORDANCE WITH THE ESTABLISHED PARAMETERS DURING THE CONNECTIVITY-VERIFICATION SESSION

422
INCLUDE, IN THE VERIFICATION-REQUEST MESSAGES, AT LEAST ONE OF THE GROUP CONSISTING OF TIMESTAMPS AND SEQUENCE NUMBERS

430
RECEIVE A VERIFICATION-REPLY MESSAGE FROM ONE OF THE ENDPOINTS, THE VERIFICATION-REPLY MESSAGE INDICATING THAT VERIFICATION-REQUEST MESSAGES WERE NOT RECEIVED AT THE ENDPOINT IN ACCORDANCE WITH THE ESTABLISHED PARAMETERS DURING THE CONNECTIVITY-VERIFICATION SESSION

440
CREATE A RECORD OF RECEIVED VERIFICATION-REPLY MESSAGES

*FIG. 4*

500 

410-1
FOR EACH ENDPOINT IN A POINT-TO-MULTIPOINT NETWORK INCLUDING A ROOT AND A PLURALITY OF ENDPOINTS, ESTABLISH PARAMETERS FOR A CONNECTIVITY-VERIFICATION SESSION BETWEEN THE ROOT AND THE ENDPOINT, THE PARAMETERS INCLUDING AN INDICATION OF AT LEAST ONE ACTION FOR THE ENDPOINT TO PERFORM IF THE ENDPOINT DOES NOT RECEIVE VERIFICATION-REQUEST MESSAGES IN ACCORDANCE WITH THE PARAMETERS DURING THE CONNECTIVITY-VERIFICATION SESSION

511
DISCOVER THE PLURALITY OF ENDPOINTS

512
INCLUDE, IN THE ESTABLISHED PARAMETERS, A REFRESH INTERVAL FOR INDICATING A TIME PERIOD DURING WHICH THE CONNECTIVITY-VERIFICATION SESSION IS VALID

513
INCLUDE, IN THE ESTABLISHED PARAMETERS, A TRANSMISSION INTERVAL THAT INDICATES AN INTERVAL BETWEEN SUCCESSIVE VERIFICATION-REQUEST MESSAGES SENT BY THE ROOT

514
INCLUDE, IN THE ESTABLISHED PARAMETERS, A DETECTION MULTIPLIER INDICATING A NUMBER OF TRANSMISSION INTERVALS THAT MAY PASS AT AN ENDPOINT WITHOUT THE ENDPOINT RECEIVING A VERIFICATION-REQUEST MESSAGE BEFORE THE ENDPOINT PERFORMS AN INDICATED ACTION

515
SEND A CONFIGURATION-ANNOUNCEMENT MESSAGE TO AN ENDPOINT, WHEREIN THE CONFIGURATION-ANNOUNCEMENT MESSAGE CONTAINS THE PARAMETERS TO BE ESTABLISHED

516
RECEIVE A CONFIGURATION-REPLY MESSAGE FROM THE ENDPOINT

*FIG. 5*

600 

610
ESTABLISH PARAMETERS FOR A CONNECTIVITY-VERIFICATION SESSION BETWEEN A FIRST NODE AND A SECOND NODE IN A NETWORK, THE PARAMETERS INCLUDING AN INDICATION OF AT LEAST ONE ACTION FOR THE SECOND NODE TO PERFORM IF THE SECOND NODE DOES NOT RECEIVE VERIFICATION-REQUEST MESSAGES IN ACCORDANCE WITH THE PARAMETERS DURING THE CONNECTIVITY-VERIFICATION SESSION

620
DETERMINE IF THE SECOND NODE IS RECEIVING VERIFICATION-REQUEST MESSAGES FROM THE FIRST NODE IN ACCORDANCE WITH THE ESTABLISHED PARAMETERS DURING THE CONNECTIVITY-VERIFICATION SESSION

630
PERFORM AT LEAST ONE INDICATED ACTION WHEN THE SECOND NODE DOES NOT RECEIVE VERIFICATION-REQUEST MESSAGES IN ACCORDANCE WITH THE ESTABLISHED PARAMETERS DURING THE CONNECTIVITY-VERIFICATION SESSION

610-1
ESTABLISH PARAMETERS FOR A CONNECTIVITY-VERIFICATION SESSION BETWEEN A FIRST NODE AND A SECOND NODE IN A NETWORK, THE PARAMETERS INCLUDING AN INDICATION OF AT LEAST ONE ACTION FOR THE SECOND NODE TO PERFORM IF THE SECOND NODE DOES NOT RECEIVE VERIFICATION-REQUEST MESSAGES IN ACCORDANCE WITH THE PARAMETERS DURING THE CONNECTIVITY-VERIFICATION SESSION

711
RECEIVE A CONFIGURATION-ANNOUNCEMENT MESSAGE FROM THE FIRST NODE, WHEREIN THE CONFIGURATION-ANNOUNCEMENT MESSAGE CONTAINS THE PARAMETERS TO BE ESTABLISHED

712
SEND A CONFIGURATION-REPLY MESSAGE TO THE FIRST NODE

713
INCLUDE, IN THE ESTABLISHED PARAMETERS, A REFRESH INTERVAL FOR INDICATING A TIME PERIOD DURING WHICH THE CONNECTIVITY-VERIFICATION SESSION IS VALID

714
INCLUDE, IN THE ESTABLISHED PARAMETERS, A TRANSMISSION INTERVAL THAT INDICATES THE INTERVAL BETWEEN SUCCESSIVE VERIFICATION-REQUEST MESSAGES

715
INCLUDE, IN THE ESTABLISHED PARAMETERS, A DETECTION MULTIPLIER INDICATING A NUMBER OF TRANSMISSION INTERVALS THAT MAY PASS WITHOUT RECEIVING A VERIFICATION-REQUEST MESSAGE FROM THE FIRST NODE BEFORE PERFORMING AN INDICATED ACTION

716
CALCULATE AT LEAST ONE OF THE GROUP CONSISTING OF IN-BAND LOSS, DELAY, AND JITTER

POINT-TO-MULTIPOINT CONNECTIVITY VERIFICATION

This application claims the benefit of the filing date of U.S. Provisional Application No. 60/814,299; filed Jun. 16, 2006; entitled "Light-weight mechanism for P2MP LSP connectivity verification;" the entirety of which provisional application is incorporated herein by reference.

FIELD OF THE INVENTION

The present disclosure relates generally to verifying connectivity between two nodes in a network. For example, embodiments disclosed herein provide for scalable and accurate approaches to verifying connectivity between the root and the endpoints of a point-to-multipoint network.

BACKGROUND OF THE INVENTION

Computer networks have become ubiquitous. Computer networks include the Internet, Service Provider (SP) networks, private networks, and Local Area Networks (LANs). Point-to-multipoint networks (sometimes referred to as multicast networks) are also known in the art and involve sending information from a single point, commonly referred to as the root, to multiple points, commonly referred to as endpoints.

BRIEF DESCRIPTION OF THE DRAWINGS

Objects, features, and advantages of inventive matter disclosed herein may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

FIG. 3 illustrates example operations performable by a network node and useful in verifying connectivity with a second node in accordance with embodiments disclosed herein.

FIG. 4 illustrates example operations performable by a root in a point-to-multipoint network and useful in verifying connectivity with a plurality of endpoints in accordance with embodiments disclosed herein.

FIG. 5 illustrates additional example operations performable by a root in a point-to-multipoint network and useful in verifying connectivity with a plurality of endpoints in accordance with embodiments disclosed herein.

FIG. 6 illustrates example operations performable by a network node and useful in verifying connectivity with a second node in accordance with embodiments disclosed herein.

FIG. 7 illustrates example operations performable by an endpoint in a point-to-multipoint network and useful in verifying connectivity with the root of the network in accordance with embodiments disclosed herein.

DESCRIPTION OF EXAMPLE EMBODIMENTS

Overview

Figure 1:
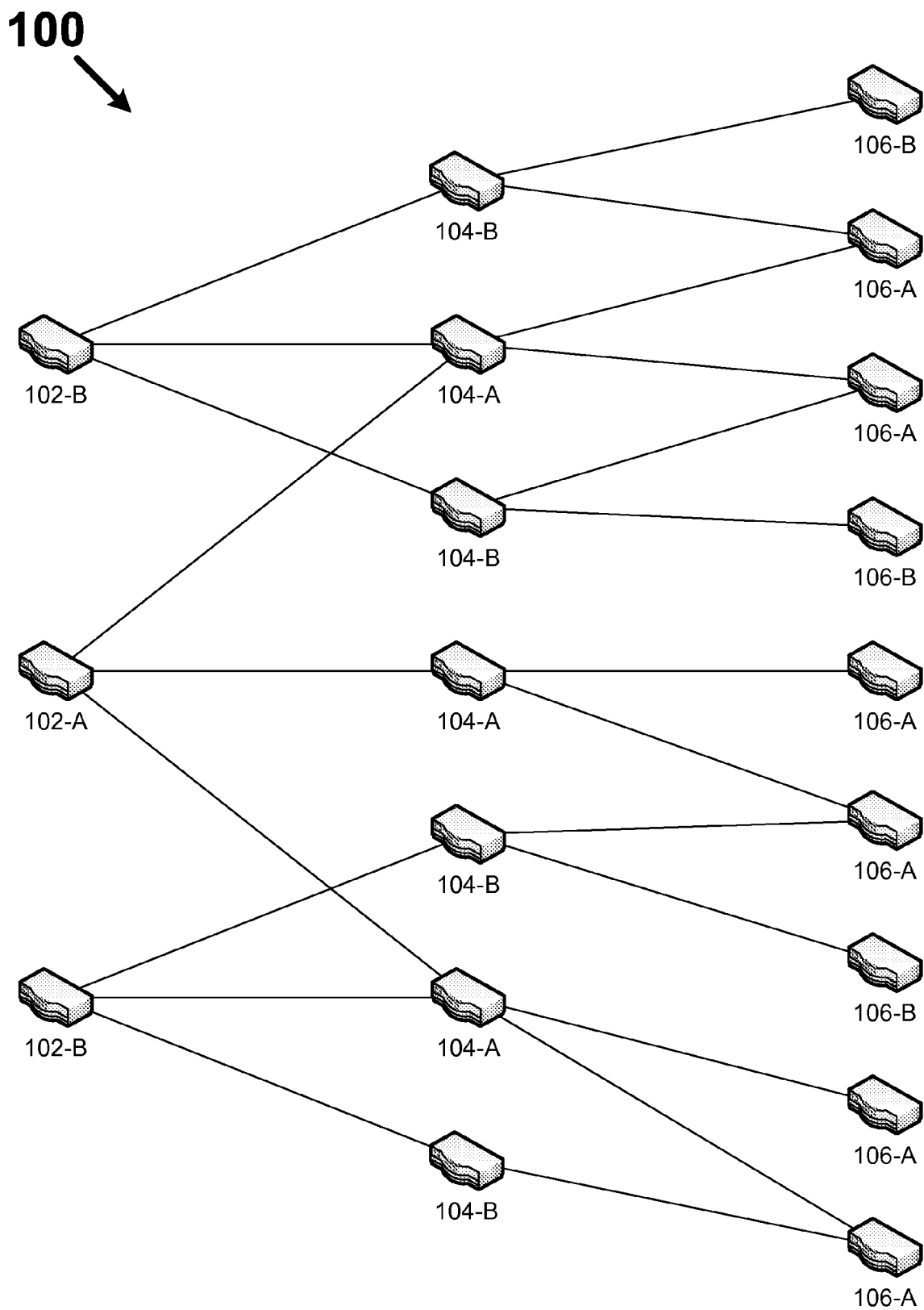
FIG. 1 illustrates a network including and an example point-to-multipoint network.

Point-to-multipoint networks may comprise many endpoints for a single root. For example, Label Distribution Protocol ("LDP") can be used to establish point-to-multipoint Label-Switched-Paths ("LSPs") having hundreds or even thousands of endpoints. LSPs are a sequence of labels at each and every node along the path from the source to the destination. Each data packet encapsulates and carries the labels during their journey from source to destination. High-speed switching of data is possible because the fixed-length labels are inserted at the very beginning of the packet or cell and can be used by hardware to switch packets quickly between links.

In MPLS, data transmission occurs on Label-Switch Paths ("LSPs"). Point-to-multipoint LSPs distribute data from a single source (i.e., the root) to a plurality of destinations (i.e., endpoints) across the network according to the next hops indicated by the routing protocols. Each LSP is identified by a Multiprotocol Label Switching ("MPLS") multicast Forwarding Equivalence Class ("FEC").

There exists a need for connectivity verification between two points, also commonly referred to as nodes, in a network, including the need for connectivity verification between the root and the endpoints in a point-to-multipoint network. Technology for verifying connectivity between two network nodes generally requires a first node to periodically send a connectivity-verification message to the second node. These connectivity-verification messages are also commonly referred to as connectivity probes, connectivity pings, connectivity checks, continuity checks, loopback test, or path consistency checks. Upon receiving each connectivity-verification message, the second node sends an explicit acknowledgment to the first node. That is, the second node sends an acknowledgment message to the first node each time the second node receives a connectivity-verification message. Upon receiving an acknowledgment message from the second node, the first node has had the connectivity to the second node verified. If the first node does not receive an acknowledgment message to the connectivity-verification message from the second node, then the connectivity to the second node is not verified.

Thus, in the above-discussed technique for verifying connectivity between two network nodes, each connectivity-verification message is responded to with an acknowledgment message to explicitly verify the connectivity. If a root in a point-to-multipoint network needs to check connectivity to each endpoint in the point-to-multipoint network, then the root needs to send connectivity-verification messages to each endpoint. However, for point-to-multipoint networks that include a large number of endpoints, the root will receive a large number of acknowledgments unless the root has lost connectivity to a significant number of endpoints. This large number of acknowledgments sent to the root from the endpoints can at least cause significant congestion at the root and may even overwhelm the root.

Embodiments discussed herein deviate with respect to technology for verifying connectivity between network nodes, such as that discussed above, and other technology also known in the prior art. Embodiments disclosed herein provide for novel and accurate techniques for verifying connectivity between network nodes that are more scalable than techniques known in the prior art. Techniques disclosed herein may be encoded as logic in one or more tangible media for execution and, when executed, operable to perform the encoded techniques.

A first example disclosure embodies logic encoded in one or more tangible media for execution and, when executed at a first network node, is useful in verifying connectivity with a second node in accordance with embodiments disclosed herein. The logic, when executed, is operable to establish parameters for a connectivity-verification session between a first node and a second node in a network. The parameters include an indication of at least one action for the second node to perform if the second node does not receive verification-request messages in accordance with the parameters during the connectivity-verification session. The logic is further operable to send verification-request messages from the first node to the second node in accordance with the established parameters during the connectivity-verification session.

A second example disclosure embodies logic encoded in one or more tangible media for execution and, when executed at a network node, is useful in verifying connectivity between two nodes in accordance with embodiments disclosed herein. For example, the logic of this second disclosure may be advantageously executed at an endpoint in a point-to-multipoint network to help verify connectivity with the root of the point-to-multipoint network. When executed, the logic is operable to establish parameters for a connectivity-verification session between a first node and a second node in a network. The parameters include an indication of at least one action to perform at the second node if verification-request messages are not received at the second node in accordance with the parameters during the connectivity-verification session. The logic is further operable to receive verification-request messages from the first node in accordance with the established parameters during the connectivity-verification session; and to perform at least one indicated action when verification-request messages are not received in accordance with the established parameters during the connectivity-verification session.

A third example disclosure embodies logic encoded in one or more tangible media for execution and, when executed at a root in a point-to-multipoint network, is useful in verifying connectivity with endpoints of the point-to-multipoint network in accordance with embodiments disclosed herein. The logic, when executed, is operable to establish parameters for a connectivity-verification session between the root and each endpoint in a point-to-multipoint network including a root and a plurality of endpoints. The parameters include an indication of at least one action for the endpoint to perform if the endpoint does not receive verification-request messages in accordance with the parameters during the connectivity-verification session. The logic is further operable to send verification-request messages from the root to each endpoint in accordance with the established parameters during the connectivity-verification session.

It is to be understood that the inventive matter disclosed herein may be embodied as logic encoded in one or more tangible media for execution and, when executed, operable to perform operations disclosed herein. The logic may be embodied strictly as a software program, as software and hardware, or as hardware alone. It is also to be understood that the inventive matter disclosed herein can be used in conjunction with numerous different communications protocols. For example, techniques described herein can be used for verifying connectivity in MPLS networks or IP networks. In particular embodiments, the verification-request messages may be implemented as Bidirectional Forwarding Detection ("BFD") packets. In other particular embodiments, the verification-request messages may be implemented as IP probes. The features disclosed herein may be employed in data communications devices and other computerized devices and software systems for such devices, such as those manufactured by Cisco Systems, Inc. of San Jose, Calif. For example, features disclosed herein can be advantageously utilized with Cisco Internet Protocol ("IP") Service Level Agreements ("IP SLA").

DESCRIPTION

FIG. 1 illustrates a network 100 that includes an example point-to-multipoint network. The network 100 comprises a plurality of roots 102-A, 102-B; a plurality of endpoints 106-A, 106-B; and a plurality of midpoints 104-A, 104-B that may connect endpoints 106-A, 106B to a root 102-A, 102-B. The point-to-multipoint network comprises a root 102-A, midpoints 104A, and endpoints 106-A.

When the root 102-A wishes to verify connectivity with an endpoint 106-A in accordance with embodiments disclosed herein, the root 102-A establishes parameters for a connectivity-verification session between the root 102-A and the endpoint 106-A. During the connectivity-verification session, the root 102-A sends verification-request messages to the endpoint 106-A in accordance with the established parameters. The parameters include an indication of at least one action for the endpoint 106-A to perform if the endpoint 106-A does not receive the verification-request messages in accordance with the parameters. Generally, the established parameters define operations of the connectivity-verification session and may include, for example, a refresh interval, which indicates a time period during which the connectivity-verification session is valid. The established parameters may also include a transmission interval that indicates an interval between successive verification-request messages. In other words, the transmission interval can determine the frequency at which the root will send verification-request messages. The established parameters may also include a detection multiplier indicating a number of transmission intervals that may pass at the second node without the second node receiving a verification-request message before the second node performs and indicated action.

In particular embodiments, the indication of at least one action for the endpoint 106-A to perform is an indication for the endpoint 106-A to send a verification-reply message to the root 102-A when the endpoint 106-A has detected that verification-request messages have not been received at the endpoint 106-A in accordance with the established parameters. Accordingly, in particular embodiments, the root 102-A is adapted to receive a verification-reply message from the endpoint 106-A. If the root 102-A actually receives a verification-reply message from the endpoint 106-A, then the root 102-A knows that connectivity with the endpoint 106-A is not verified. This differs from prior art embodiments in which a reply message from an endpoint to a root is an indication that connectivity is verified.

In particular embodiments, the root 102-A may establish parameters for connectivity-verification sessions between the root 102-A and each of a plurality of endpoints 106-A in the point-to-multipoint network. Because endpoints 106-A only perform the actions indicated by the established parameters when the endpoint 106-A does not receive verification-request messages in accordance with the established parameters, the root 102-A only receives verification-reply messages from those endpoints 106-A for which connectivity is not verified. In this manner, reply traffic to the root 102-A can be greatly reduced relative to conventional techniques for connectivity verification in point-to-multipoint networks.

Figure 2:
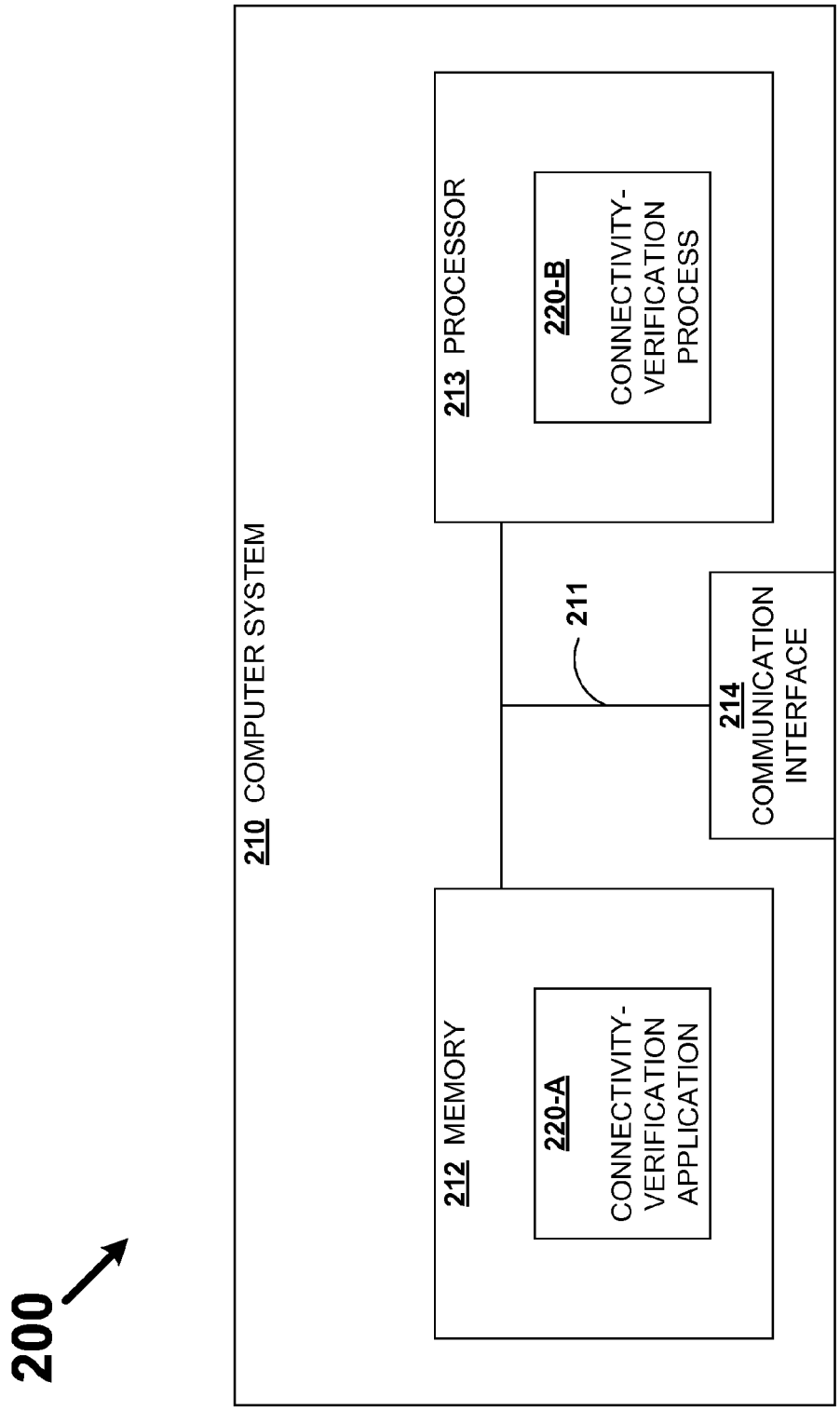
FIG. 2 illustrates an example computer system architecture for a computer system that performs methods useful in protecting multi-segment pseudowires in accordance with embodiments disclosed herein.

FIG. 2 illustrates an example computer system architecture 200 for a computer system 210 that performs operations useful for verifying connectivity in accordance with embodiments disclosed herein. The computer system 210 may be any type of computerized system such as a router, personal computer, workstation, portable computing device, mainframe, server, or similar apparatus. In this example, the computer system 210 includes an interconnection mechanism 211 that couples a memory system 212, a processor 213, and a communications interface 214. The communications interface 214 allows the computer system 210 to communicate with external devices or systems.

The memory system 212 may be any type of computer-readable medium that is encoded with a connectivity-verification application 220-A that represents software code such as data and/or logic instructions (e.g., stored in the memory or on another computer-readable medium such as a disk) that embody the processing functionality of embodiments of the invention as explained above. The processor 213 can access the memory system 212 via the interconnection mechanism 211 in order to launch, run, execute, interpret, or otherwise perform the logic instructions of the connectivity-verification application 220-A for the host in order to produce a corresponding connectivity-verification process 220-B. In other words, the connectivity-verification process 220-B represents one or more portions of the connectivity-verification application 220-A performing within or upon the processor 213 in the computer system 210.

It is to be understood that embodiments of the invention include the connectivity-verification application 220-A (i.e., the un-executed or non-performing logic instructions and/or data) encoded within a computer-readable medium such as a floppy disk, hard disk or in an optical medium, or in a memory type system such as in firmware, read only memory (ROM), or, as in this example, as executable code within the memory system 212 (e.g., within random access memory or RAM). The connectivity-verification application 220-A embodies methods disclosed herein for performing connectivity-verification operations. It is also to be understood that other embodiments of the invention can provide the connectivity-verification application operating within the processor 213 as the connectivity-verification process 220-B. While not shown in this example, those skilled in the art will understand that the computer system 210 may include other processes and/or software and hardware components, such as an operating system, which have been left out of this illustration for ease of description of the invention.

FIG. 3 illustrates example operations 300 performable by an apparatus, such as the computer system 210 executing the connectivity-verification application 220-A, operating as a first network node and useful in verifying connectivity with a second network node in accordance with embodiments disclosed herein. For example, the first network node may be the root 102-A of FIG. 1 and the second node may be an endpoint 106-A of FIG. 1. In other particular embodiments, the example operations 300 may be performed by an apparatus (e.g., shadow router) communicatively connected to the first network node.

In step 310, the first node establishes parameters for a connectivity-verification session between the first node and the second node in a network. The parameters include an indication of at least one action for the second node to perform if the second node does not receive verification-request messages in accordance with the parameters during the connectivity-verification session.

In step 320, the first node sends verification-request messages from the first node to the second node in accordance with the established parameters during the connectivity-verification session. Thus, a verification-request message is a message sent from a first node to a second node during the connectivity-verification session and in accordance with parameters established between the first node and the second node as described in embodiments disclosed herein.

An indicated action is an action that the second node is to perform if the second node detects that verification-request messages are not being received at the second node in accordance with the established parameters. For example, if the second node receives no verification-request messages at all, the connection from the first node to the second node has failed and the second node performs an indicated action, indicating the failure of the connection. Thus, an indicated action, when performed, signals an alarm that connectivity between the first node and the second node is not verified. The details of how the alarm is signaled is determined by the particular action that is performed. For example, one action might include the second node sending a verification-reply message to the first node. A second example action may include signaling an operator of the second node. A third example action may include signaling an administrator of the network. A fourth example action may include invoking software that is designed to locate and fix errors that may be causing the lack of connectivity.

FIG. 4 illustrates example operations 400 performable by an apparatus, such as the computer system 210 executing the connectivity-verification application 220-A, operating as a root in a point-to-multipoint network and useful in verifying connectivity with a plurality of endpoints in accordance with embodiments disclosed herein. In other particular embodiments, the example operations 400 may be performed by an apparatus (e.g., shadow router) communicatively connected to the root.

In step 410, the root establishes parameters for a connectivity-verification session between the root and each of the plurality of endpoints. The parameters include an indication of at least one action for the endpoint to perform if the endpoint does not receive verification-request messages in accordance with the parameters during the connectivity-verification session. The established parameters between two different endpoints are not necessarily identical. That is, in particular embodiments, the parameters that the root establishes with a first endpoint may be different than the parameters that the root establishes with a second endpoint. However, in other particular embodiments, the parameters that the root establishes with all the endpoints in a particular network will all be identical.

In step 420, the root sends verification-request messages during the connectivity-verification session to each endpoint in accordance with the parameters established with each endpoint. In particular embodiments, step 420 may comprise step 422. In step 422, the root includes timestamps, or sequence numbers, or both in the verification-request messages. A timestamp inserted into a verification-request message is typically the time at which the verification-request message was sent from the root. Sequence numbers inserted into the verification-request messages indicate the order in which individual messages are sent. Typically, each successive verification-request message will have a sequence number that is one greater than the sequence number inserted into the immediately previous verification-request message sent. For example, if 100 verification-request messages are sent, the first verification-request message sent may include a sequence number of 1, the second message a sequence number of 2, the third message a sequence number of 3, and so on. In step 422, the root will include, in the verification-request messages at least one of the group consisting of timestamps and sequence numbers.

In step 430, the root receives a verification-reply message from one of the endpoints. Thus, in this embodiment, one of the parameters established with this endpoint may have been an indication for the endpoint to send a verification-reply message to indicate that verification-request messages were not received at the endpoint in accordance with the parameters. Upon detecting that the verification-request messages are not being received in accordance with the parameters, the endpoint sends a verification-reply message and, in step 430, the root receives the verification-reply message, indicating to the root that the endpoint is not receiving verification-request message in accordance with the established parameters.

In step 440, the root creates a record of received verification-reply messages. Such a record can be advantageously used to keep track of a history of connectivity with each endpoint. This history may provide evidence or clues as to what changes might be made to a network to reduce future loss of connectivity.

FIG. 5 illustrates additional example operations 500 performable by an apparatus, such as the computer system 210 executing the connectivity-verification application 220-A, operating as a root in a point-to-multipoint network and useful in verifying connectivity with a plurality of endpoints in accordance with embodiments disclosed herein. In other particular embodiments, the example operations 500 may be performed by an apparatus (e.g., shadow router) communicatively connected to the root. Step 410-1 comprises an example embodiment of step 410 in FIG. 4. In step 410-1, the root establishes parameters for a connectivity-verification session between the root and each of the plurality of endpoints. The parameters include an indication of at least one action for the endpoint to perform if the endpoint does not receive verification-request messages in accordance with the parameters during the connectivity-verification session. In particular embodiments, step 410-1 comprises at least one of step 511, step 512, step 513, step 514, and the combination of steps 515 and 516.

In particular embodiments, techniques to establish the parameters between the root and each of the plurality of endpoints in step 410-1 may be techniques that comprise modifications to known techniques. For example, in MPLS point-to-multipoint LSPs, the root may use a MPLS Echo Request message to bootstrap the connectivity-verification session and establish the parameters. A root may create a connectivity-verification session and establish parameters by initiating a MPLS Echo Request/Reply message exchange. In particular embodiments, the root sends a MPLS Echo Request message containing a connectivity-verification-session object. The connectivity-verification-session object establishes the connectivity-verification session between the root and the endpoint and establishes the parameters for the connectivity-verification session. That is, in particular embodiments, the connectivity-verification-session object is used to notify endpoints that connectivity verification will be performed on the LSP and to establish the connectivity verification parameters. A connectivity-verification-session object may be sent as a Type Length Value ("TLV") element. A MPLS Echo Reply message can be used to confirm to the root that the connectivity-verification session is acknowledged and the parameters for the session are established.

In step 511, the root discovers the plurality of endpoints. Techniques for discovering endpoints in a point-to-multipoint network are known in the art and these techniques can be advantageously used in embodiments disclosed herein during the step of establishing parameters (e.g., step 410-1).

In step 512, the root includes a refresh interval in the established parameters. The refresh interval is a value that indicates a time period for which the connectivity-verification session is valid. In particular embodiments, the root will periodically send a refresh message that restarts or refreshes the connectivity-verification session. A refresh message may keep parameters the same or may change parameters. Thus, in particular embodiments, the refresh interval is expressed as a minimum period before a refresh message is sent by the root.

In step 513, the root includes a transmission interval in the established parameters. The transmission interval indicates the interval between successive verification-request messages sent by the root. The transmission interval allows the endpoint to know the frequency at which the root will send verification-request messages and, therefore, the frequency at which the endpoint can expect to receive the verification-request messages.

In step 514, the root includes a detection multiplier in the established parameters. The detection multiplier indicates a number of transmission intervals that may pass at the endpoint without the endpoint receiving a verification-request message before the endpoint performs an indicated action. Thus, in particular embodiments, an endpoint will keep track of the time between successive, received verification-reply messages. When this time exceeds the number of transmission intervals indicated by the detection multiplier before a successive verification-request message is received, the endpoint signals an alarm by performing at least one indicated action (e.g., sending a verification-reply message to the root).

In particular embodiments, the root and endpoint may perform a message exchange to confirm the configuration of a connectivity-verification session and the establishment of the parameters. The MPLS Echo Request/Reply exchange described above is one example of such a message exchange. In step 515, the root sends a configuration-announcement message (e.g., MPLS Echo Request) to the endpoint. The configuration-announcement contains the parameters to be established. The endpoint confirms the configuration by sending a configuration-reply message (e.g., MPLS Echo Reply) to the root. In step 516, the root receives the configuration-reply message.

FIG. 6 illustrates example operations 600 performable by an apparatus, such as the computer system 210 executing the connectivity-verification application 220-A, operating as the second of two network nodes and useful in verifying connectivity between the two nodes in accordance with embodiments disclosed herein. For example, the first network node may be the root 102-A of FIG. 1 and the second node may be an endpoint 106-A of FIG. 1. In other particular embodiments, the example operations 600 may be performed by an apparatus (e.g., shadow router) communicatively connected to the second network node.

In step 610, the second node establishes parameters for a connectivity-verification session between the first node and the second node in a network. The parameters include an indication of at least one action for the second node to perform if the second node does not receive verification-request messages in accordance with the parameters during the connectivity-verification session.

In step 620, the second node determines if the second node is receiving verification-request messages from the first node in accordance with the established parameters during the connectivity-verification session. As explained above, a verification-request message is a message sent from a first node to the second node during the connectivity-verification session and in accordance with parameters established between the first node and the second node as described in embodiments disclosed herein. As explained in relation to step 422, the received verification-request messages may include timestamps and sequence numbers.

In step 630, the second node performs at least one indicated action when verification-request messages are not received in accordance with the established parameters during the connectivity-verification session.

FIG. 7 illustrates example operations 700 performable by an apparatus, such as the computer system 210 executing the connectivity-verification application 220-A, operating as an endpoint in a point-to-multipoint network and useful in verifying connectivity with the root of the network in accordance with embodiments disclosed herein. In other particular embodiments, the example operations 700 may be performed by an apparatus (e.g., shadow router) communicatively connected to the endpoint.

Step 610-1 comprises an example embodiment of step 610 in FIG. 6. In step 610-1, the endpoint establishes parameters for a connectivity-verification session with a root in a point-to-multipoint network. The parameters include an indication of at least one action to perform if verification-request messages are not received in accordance with the parameters during the connectivity-verification session. In particular embodiments, step 610-1 comprises at least one of step 713, step 714, step 715, step 716, and the combination of steps 711 and 712.

As explained above, the root and endpoint may perform a message exchange to confirm the configuration of a connectivity-verification session and the establishment of the parameters. In step 711, the endpoint receives a configuration-announcement message from the root. The received configuration-announcement message contains the parameters to be established. Step 711 corresponds to step 515, wherein the root sends a configuration-announcement message to the endpoint. That is, in particular embodiments, the configuration-announcement message sent by the root in step 515 is the same configuration-announcement message received by the endpoint in step 711.

In step 712, the endpoint sends a configuration-reply message to the root. Step 712 corresponds to step 516, wherein the root receives a configuration-reply message from an endpoint. That is, in particular embodiments, the configuration-announcement reply sent by the endpoint in step 712 is the same configuration-announcement reply received by the root in step 516.

In step 713, the endpoint includes a refresh interval in the established parameters. Typically, the endpoint includes the refresh interval into the established parameters simply by accepting a refresh interval sent by the root as explained above. That is, the root typically sends parameters to the endpoint and the endpoint may include these as established parameters by accepting the sent parameters.

In step 714, the endpoint includes a transmission interval into the established parameters. Similarly to the refresh interval, the endpoint may include the transmission interval into the established parameters simply by accepting a transmission interval sent by the root. Since the transmission interval indicates the interval between successive verification-request messages sent by the root, the transmission interval allows the endpoint to know the frequency at which the root will send verification-request messages and, therefore, the frequency at which the endpoint can expect to receive the verification-request messages.

In step 715, the endpoint includes a detection multiplier into the established parameters. Similarly to the refresh interval and the transmission interval, the endpoint may include the detection multiplier into the established parameters simply by accepting a detection multiplier sent by the root. The detection multiplier indicates a number of transmission intervals that may pass at the endpoint without the endpoint receiving a verification-request message before the endpoint performs an indicated action. Thus, in particular embodiments, an endpoint will keep track of the time between successive, received verification-reply messages. When this time exceeds the number of transmission intervals indicated by the detection multiplier before a successive verification-request message is received, the endpoint signals an alarm by performing at least one indicated action (e.g., sending a verification-reply message to the root).

In step 716, the endpoint calculates at least one of the group consisting of in-band loss, delay, and jitter. In particular embodiments, the endpoint can use the established parameters as well as timestamps and sequence numbers received in verification-request messages to calculate in-band loss, delay, or jitter for the arriving verification-request messages in much the same way that in-band loss, delay, and jitter are calculated for packet streams in conventional technology.

Having described preferred embodiments of the invention it will now become apparent to those of ordinary skill in the art that other embodiments incorporating these concepts may be used. Additionally, software included as part of the invention may be embodied in a computer program product that includes a computer-readable medium. For example, such a computer-readable medium can include a readable memory device, such as a hard drive device, a CD-ROM, a DVD-ROM, or a computer diskette having computer-readable program code segments stored thereon. The computer-readable medium can also include a communications link, either optical, wired, or wireless, having program code segments carried thereon as digital or analog signals.

Improved connectivity verification is herein disclosed. While inventive matter has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A method comprising:
   establishing parameters for a connectivity-verification session between a first node and at least one receiving node in a network, wherein the connectivity-verification session is configured to verify connectivity between the first node and the at least one receiving node in accordance with the established parameters, and wherein the parameters include an indication of at least one action for the at least one receiving node to perform if the at least one receiving node does not receive one or more verification-request messages from the first node in accordance with the parameters during the connectivity-verification session;
   sending, during the connectivity-verification session, at least one of the one or more verification-request messages from the first node to the at least one receiving node in accordance with the established parameters during the connectivity-verification session;
   receiving, during the connectivity-verification session, at least one verification-reply message from the at least one receiving node at the first node, the at least one verification-reply message indicative of a determination by the at least one receiving node of whether to send the at least one verification-reply message to the first node, wherein the determination comprises:
- a determination to send the at least one verification-reply message if the at least one receiving node does not receive any of the one or more verification-request messages in accordance with the established parameters; and
- a determination not to send the at least one verification-reply message if the at least one receiving node receives at least one of the one or more verification-request messages in accordance with the established parameters; and periodically re-establishing the parameters for the connectivity-verification session between the first node and the at least one receiving node in the network.

2. The method of claim 1, further comprising:
creating a record of received verification-reply messages.

3. The method of claim 1, wherein establishing the parameters comprises:
establishing the parameters for a connectivity-verification session between the first node and the at least one receiving node in the network, wherein the established parameters include at least one parameter from the group consisting of:
- a refresh interval for indicating a time period during which the connectivity-verification session is valid;
- a transmission interval that indicates an interval between successive verification request messages; and
- a detection multiplier indicating a number of transmission intervals that may pass at the at least one receiving node without the at least one receiving node receiving one of the one or more verification-request messages before the at least one receiving node performs an indicated action.

4. The method of claim 1, wherein sending the one or more verification request messages comprises:
sending the one or more verification-request messages from the first node to the at least one receiving node in accordance with the established parameters that include at least one of the group consisting of timestamps and sequence numbers.

5. The method of claim 1, wherein establishing the parameters comprises:
sending a configuration-announcement message from the first node to the at least one receiving node, the configuration-announcement message containing the parameters to be established; and
receiving a configuration-reply message from the at least one receiving node.

6. The method of claim 1, wherein the network is a point-to-multipoint network, the first node comprising a root and the at least one receiving node comprising a plurality of endpoints in the point-to-multipoint network,
wherein establishing the parameters for the connectivity-verification session between the first node and the at least one receiving node comprises: establishing the parameters for a connectivity-verification session between the root and the plurality of endpoints, the parameters including an indication of at least one action for the endpoint to perform if, for each of the plurality of endpoints, the endpoint does not receive at least one of the one or more verification-request messages from the root in accordance with the parameters during the connectivity-verification session;
wherein receiving, during the connectivity-verification session, the at least one verification-reply message from the at least one node at the first node comprises:
receiving at least one verification-reply message from at least one of the plurality of endpoints, the at least one verification-reply message being indicative of the determination by the at least one receiving node of whether to send the at least one verification-reply message to the first node; and
wherein the method further comprises periodically re-establishing the parameters for the connectivity-verification session between the first node and the plurality of endpoints in the point-to-multipoint network.

7. The method of claim 6, comprising:
discovering the plurality of endpoints in the point-to-multipoint network.

8. The method of claim 6, wherein the plurality of endpoints includes a first endpoint and a second endpoint, and wherein establishing parameters comprises establishing a first value for a parameter for a connectivity session between the root and the first endpoint and establishing a second value for the parameter for a connectivity session between the root and the second endpoint, wherein the first value and the second value are different from one another.

9. The method of claim 1, wherein periodically re-establishing the parameters for the connectivity-verification session between the first node and the at least one receiving node comprises: periodically sending configuration-announcement messages from the first node to the at least one receiving node, each of the configuration-announcement messages containing the parameters to be re-established.

10. The method of claim 1, wherein periodically re-establishing the parameters for the connectivity-verification session between the first node and the at least one receiving node comprises: periodically refreshing the connectivity-verification session.

11. An apparatus comprising:
a processor;
a memory unit that stores instructions associated with an application executable by the processor; and
an interconnect coupling the processor and the memory unit, enabling the apparatus to execute the application, and when executing the application, is operable to:
establish parameters for a connectivity verification session between a first node and at least one receiving node in a network, wherein the connectivity-verification session is configured to verify connectivity between the first node and the at least one receiving node in accordance with the established parameters, and wherein the parameters include an indication of at least one action for the at least one receiving node to perform if the at least one receiving node does not receive one or more verification-request messages from the first node in accordance with the parameters during the connectivity verification session;
send, during the connectivity-verification session, the one or more verification-request messages from the first node to the at least one receiving node in accordance with the established parameters;
receive, during the connectivity-verification session, at least one verification-reply message from the at least one receiving node at the first node, the at least one verification-reply message indicative of a determination by the at least one receiving node of whether to send the at least one verification-reply message to the first node, wherein the determination comprises:
a determination to send the at least one verification-reply message to the first node if the at least one receiving node does not receive any of the one or more verification-request messages in accordance with the established parameters; and a determination not to send the at least one verification-reply message to the first node if the at least one receiving node receives at least one of the one or more verification-request messages in accordance with the established parameters; and periodically re-establish the parameters for the connectivity-verification session between the first node and the at least one receiving node.

12. The apparatus of claim 11, wherein the apparatus, when executing the application, is further operable to:
create a record of received verification-reply messages.

13. The apparatus of claim 11, wherein the apparatus when executing the application, is further operable to:
establish the parameters for a connectivity-verification session between the first node and the at least one receiving node in the network, wherein the established parameters include at least one parameter from the group consisting of:
a refresh interval for indicating a time period during which the connectivity-verification session is valid;
a transmission interval that indicates an interval between successive verification-request messages; and
a detection multiplier indicating a number of transmission intervals that may pass at the at least one receiving node without the at least one receiving node receiving a verification-request message before the at least one receiving node performs an indicated action.

14. The apparatus of claim 11, wherein the apparatus when executing the application, is further operable to:
send at least one of the one or more verification-request messages from the first node to the at least one receiving node in accordance with the established parameters, wherein the one or more verification-request messages include at least one of the group consisting of timestamps and sequence numbers.

15. The apparatus of claim 11, wherein the apparatus when executing the application, is further operable to:
send a configuration-announcement message from the first node to the at least one receiving node, the configuration-announcement message containing the parameters to be established.

16. The apparatus of claim 11, wherein the network is a point-to-multipoint network, the first node comprising a root and the at least one receiving node comprising a plurality of endpoints in the point-to-multipoint network,
wherein the apparatus, when executing the application, is operable to establish the parameters for the connectivity-verification session between the first node and the at least one receiving node by: establishing the parameters for a connectivity-verification session between the root and the plurality of endpoints, the parameters including an indication of at least one action for the endpoint to perform if, for each of the plurality of endpoints, the endpoint does not receive at least one of the one or more verification-request messages from the root in accordance with the parameters during the connectivity-verification session;
wherein the apparatus, when executing the application, is operable to receive, during the connectivity-verification session, the at least one verification-reply message from the at least one node at the first node by: receiving the verification-reply message from at least one of the plurality of endpoints, the at least one verification-reply message being indicative of the determination by the at least one receiving node of whether to send the at least one verification-reply message to the first node; and
wherein the apparatus, when executing the application, is operable to periodically re-establish the parameters for the connectivity-verification session between the first node and the plurality of endpoints in the point-to-multipoint network.

17. The apparatus of claim 16, wherein the apparatus, when executing the application, is further operable to discover the plurality of endpoints in the point-to-multipoint network.

18. The apparatus of claim 11, wherein the apparatus, when executing the application, is operable to periodically re-establish the parameters for the connectivity-verification session between the first node and the at least one receiving node by: periodically sending configuration-announcement messages from the first node to the at least one receiving node, each of the configuration-announcement messages containing the parameters to be re-established.

19. The apparatus of claim 11, wherein the apparatus, when executing the application, is operable to periodically re-establish the parameters for the connectivity-verification session between the first node and the at least one receiving node by: periodically refreshing the connectivity-verification session.

20. A method comprising:
establishing parameters for a connectivity-verification session between a first node and a at least one receiving node in a network, wherein the connectivity-verification session is configured to verify connectivity between the first node and the at least one receiving node in accordance with the established parameters, and wherein the parameters include an indication of at least one action for the at least one receiving node to perform if the at least one receiving node does not receive one or more verification-request messages from the at least one receiving node in accordance with the parameters during the connectivity-verification session;
determining, during the connectivity-verification session, if the at least one receiving node is receiving the one or more verification-request messages from the first node in accordance with the established parameters;
determining whether to send at least one verification reply message to the first node, wherein the determination comprises:
a determination to send the at least one verification reply message to the first node if the at least one receiving node does not receive any of the one or more verification-request messages in accordance with the established parameters; and
a determination not to send the verification reply message to the first node if the at least one receiving node receives at least one of the one or more verification-request messages in accordance with the established parameters; and
periodically re-establishing the parameters for the connectivity-verification session between the first node and the at least one receiving node.

21. The method of claim 20, wherein establishing the parameters comprises: receiving, from the first node, a configuration announcement message containing the parameters to be established; and sending a configuration-reply message to the first node.

22. The method of claim 20, further comprising: calculating at least one of the group consisting of inband loss, delay, and jitter.

23. The method of claim 20, further comprising:
performing, during the connectivity-verification session, at least one indicated action when the at least one receiving node does not receive at least one of the one or more verification-request messages in accordance with the established parameters, wherein, during the connectivity-verification session, no action associated with the connectivity-verification session is performed while the at least one receiving node is receiving the verification-request messages in accordance with the established parameters.

24. The method of claim 20, wherein periodically re-establishing the parameters for the connectivity-verification session between the first node and the at least one receiving node comprises:
periodically receiving configuration-announcement messages from the first node to the at least one receiving node, each of the configuration-announcement messages containing the parameters to be re-established.

25. An apparatus comprising:
a processor; a memory unit that stores instructions associated with an application executable by the processor; and
an interconnect coupling the processor and the memory unit, enabling the apparatus to execute the application, and when executing the application, is operable to:
establish parameters for a connectivity verification session between a first node and at least one receiving node in a network, wherein the connectivity-verification session is configured to verify connectivity between the first node and the at least one receiving node in accordance with the established parameters, and wherein the parameters include an indication of at least one action for the at least one receiving node to perform if the at least one receiving node does not receive one or more verification-request messages from the first node in accordance with the parameters during the connectivity verification session;
determine, during the connectivity-verification session, if the at least one receiving node is receiving the one or more verification-request messages from the first node in accordance with the established parameters; and
determine whether to send at least one verification reply message to the first node, wherein the determination comprises:
a determination to send the at least one verification reply message to the first node if the at least one receiving node does not receive any of the one or more verification-request messages in accordance with the established parameters;
a determination not to send the at least one verification reply message to the first node if the at least one receiving node receives at least one of the one or more verification-request messages in accordance with the established parameters; and
periodically re-establish the parameters for the connectivity-verification session between the first node and the at least one receiving node.

26. The apparatus of claim 25, wherein the apparatus, when executing the application, is further operable to:
receive, from the first node, a configuration announcement message containing the parameters to be established; and
send a configuration-reply message to the first node.

27. The apparatus of claim 25, wherein the apparatus, when executing the application, is further operable to:
calculate at least one of the group consisting of inband loss, delay, and jitter.

28. The apparatus of claim 25, wherein the apparatus, when executing the application, is further operable to:
perform, during the connectivity-verification session, at least one indicated action when the at least one receiving node does not receive at least one of the one or more verification-request messages in accordance with the established parameters, wherein, during the connectivity-verification session, no action associated with the connectivity-verification session is performed while the at least one receiving node is receiving the one or more verification-request messages in accordance with the established parameters.

29. The apparatus of claim 25, wherein the apparatus, when executing the application, is operable to: periodically re-establish the parameters for the connectivity-verification session between the first node and the at least one receiving node by:
periodically receiving configuration-announcement messages from the first node, each of the configuration-announcement messages containing the parameters to be re-established.

* * * * *